US008022815B2

(12) United States Patent
Frank

(10) Patent No.: US 8,022,815 B2
(45) Date of Patent: Sep. 20, 2011

(54) MAGNETIC RFID COUPLER WITH BALANCED SIGNAL CONFIGURATION

(75) Inventor: Markus Frank, Stråvalla (SE)

(73) Assignees: Kabushiki Kaisha Sato (JP); Kabushiki Kaisha Sato Chishiki Zaisan Kenkyusyo (JP)

( * ) Notice: Subject to any disclaimer, the term of this patent is extended or adjusted under 35 U.S.C. 154(b) by 0 days.

(21) Appl. No.: 12/681,973

(22) PCT Filed: Oct. 16, 2009

(86) PCT No.: PCT/JP2009/005409

§ 371 (c)(1),
(2), (4) Date: Apr. 7, 2010

(87) PCT Pub. No.: WO2011/045844

PCT Pub. Date: Apr. 21, 2011

(65) Prior Publication Data

US 2011/0090054 A1 Apr. 21, 2011

(51) Int. Cl.
*H04Q 5/22* (2006.01)
*G08B 13/14* (2006.01)

(52) U.S. Cl. ................... 340/10.51; 340/10.1; 340/10.4; 340/572.7; 340/572.8; 238/435

(58) Field of Classification Search ............... 340/10.51, 340/10.1–10.4, 572.7, 572.8; 235/435, 492; 400/70, 76; 343/700, 850, 856; 361/728
See application file for complete search history.

(56) References Cited

U.S. PATENT DOCUMENTS 4,719,470 A * 1/1988 Munson ................. 343/700 MS
5,625,328 A * 4/1997 Coleman, Jr. ................. 333/116
5,945,938 A * 8/1999 Chia et al. ....................... 342/42
6,313,798 B1 * 11/2001 Bancroft et al. ....... 343/700 MS
6,320,478 B1 * 11/2001 Sims, III ....................... 333/127
6,538,528 B2 * 3/2003 Louzir et al. .................. 333/128
6,899,476 B1 * 5/2005 Barrus et al. ..................... 400/76
7,158,033 B2 * 1/2007 Forster ....................... 340/572.1
7,190,270 B2 3/2007 Brown et al.
7,348,885 B2 3/2008 Chiu
7,425,887 B2 9/2008 Tsirline et al.
7,551,140 B2 * 6/2009 Knadle et al. .......... 343/700 MS
7,605,706 B2 * 10/2009 Khatri ........................ 340/572.7
7,750,813 B2 * 7/2010 Deavours et al. .......... 340/572.7

FOREIGN PATENT DOCUMENTS

JP 6-104627 A 4/1994
JP 2005-20156 A 1/2005
JP 2009-212727 A 9/2009
WO WO 2007/046134 A1 4/2007

OTHER PUBLICATIONS

International Search Report dated Feb. 2, 2010, issued in corresponding international application No. PCT/JP2009/005409.
Tsirline, Boris Y.: "UHF RFID Antennas for Pinter-Encoders—Part 2: Antenna Types." High Frequency Electronics, Summit Technical Media, Oct. 2007. pp. 36-45.

* cited by examiner

*Primary Examiner* — Brian Zimmerman
*Assistant Examiner* — Nam V Nguyen
(74) *Attorney, Agent, or Firm* — Ostrolenk Faber LLP

(57) ABSTRACT

A magnetic coupler arrangement that includes two quarter wave length strip patches, an input signal source, a signal splitter that splits an input signal from the input signal source into two signals and phase-shifts one of the two signals, wherein the phase-shifted signal and the non-phase-shifted signal are fed into the patches of the coupler to achieve a balanced signal configuration.

16 Claims, 2 Drawing Sheets

[Fig. 1]
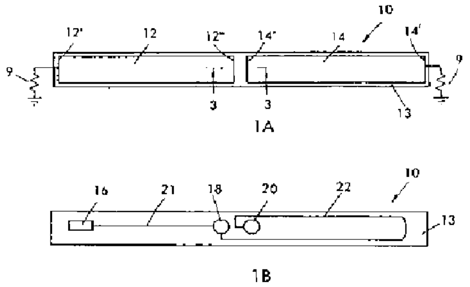
[Fig. 2]
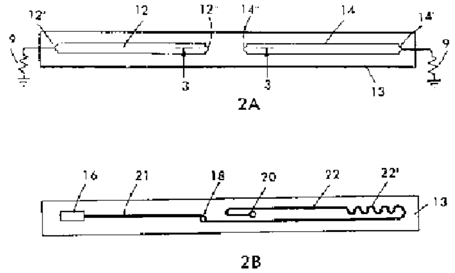
[Fig. 3]
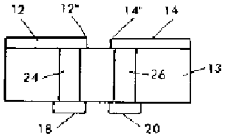
[Fig. 4]
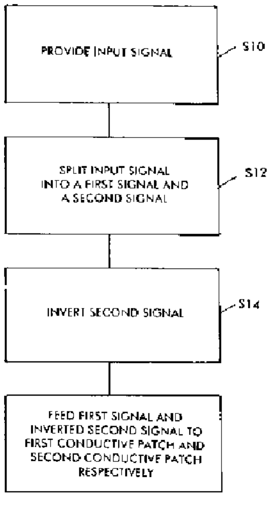

[Fig. 5]
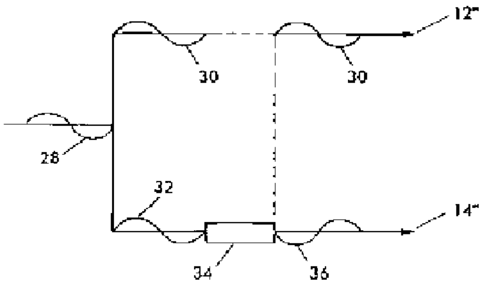
[Fig. 6]
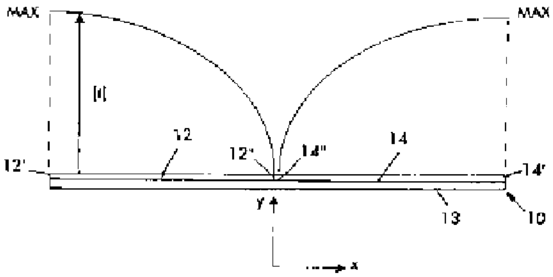
[Fig. 7]
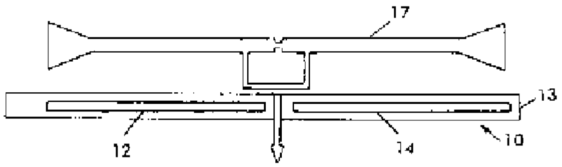
[Fig. 8]
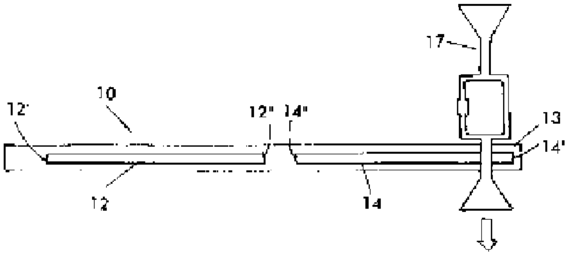

MAGNETIC RFID COUPLER WITH BALANCED SIGNAL CONFIGURATION

CROSS REFERENCE TO RELATED APPLICATIONS

The present application is a 35 U.S.C. §371 National Phase conversion of PCT/JP2009/005409, filed Oct. 16, 2009, the disclosure of which is incorporated herein by reference.

TECHNICAL FIELD

The present invention relates to RFID technology, and particularly to a magnetic coupler arrangement suited for use in an RFID printer/encoder or other near field encoding applications.

BACKGROUND ART

An antenna is a well known arrangement for radiating or receiving electromagnetic waves. While antennas are available in a variety of shapes and sizes, they all function based on the same basic principles. In the reception mode, an antenna intercepts a propagating electromagnetic wave, which then induces an electronic signal within the antenna. The electronic signal can be then fed into an integrated circuit that deciphers the signal. In the transmission mode, an antenna receives an electronic signal through a feed line, which then induces a field surrounding the antenna that results in the formation of a free-space propagating electromagnetic wave. The antenna's features such as its dimensions can be obtained by reference to its operation frequency, radiation patterns, loss, gain, and the like. Antennas are typically made from metallic materials and have a wide variety of configurations. One known configuration is a dipole antenna that includes two conductive bodies of equal length each receiving an input signal at one end thereof. The two conductive bodies of a typical dipole antenna are elongated bodies that are aligned with one another. Each body may be one-quarter of the wavelength of the target wavelength which is to be transmitted or received by the antenna.

Antennas are prevalently used in wireless devices such as cell phones and the like to direct incoming and outgoing electromagnetic waves between a free space and a transmission line. Antennas are also used in radio frequency identification device (RFID) applications.

An RFID device that includes an antenna is usually referred to as an inlay. An inlay may include an antenna as well as a transponder, which is an integrated circuit for deciphering signals sent to the inlay and received by the antenna and also for sending a signal to the antenna which is then transmitted by the antenna. The inlay antenna may be tuned (i.e. sized) to communicate at a certain target frequency with a transceiver which is sometimes referred to as the interrogator. The interrogator typically includes an antenna for communication with the RFID inlay. An inlay may be active or passive. An active inlay would include its own power source such as a battery, while a passive inlay would receive its power from an external source such as an interrogator.

A magnetic coupler that employs a terminated transmission line can be used in encoding of RFID-enabled labels, tickets, tags, cards or other media. U.S. Pat. Nos. 7,425,887 and 7,190,270 disclose RFID printers/encoders which employ single transmission line couplers for communication with RFID inlays.

PTL 1: U.S. Pat. No. 7,425,887 U.S. Pat. No. 7,190,270 U.S. Pat. No. 7,348,885

SUMMARY OF INVENTION

Technical Problem

Magnetic coupling is a commonly used method for reading or encoding RFID tags. While prevalently employed, magnetic coupling is not without drawbacks. For example, magnetic coupling generally depends on the geometry of the RFID inlay antenna, often requiring complex processes for determining an optimal alignment of transceiver with the RFID antenna to effectively project the magnetic field between the transceiver and the RFID antenna to obtain coupling. Furthermore, the process may have to be changed when the shape of the inlay antenna is changed.

A disadvantage of the currently available RFID technology is that the current distribution in the transmission line is not optimal for all types of inlays, especially for inlays that have small antennas and for inlays with antennas that do not align with the direction of the current in the transmission line of the encoder. Furthermore, the signal distribution in the transmission line of the encoder is not optimal for inlays having dipole type antennas.

Alternatively, capacitive coupling may be used to couple a transceiver with an inlay. U.S. Pat. No. 7,348,885 discloses a capacitive RFID tag encoder that includes a substrate, a first plurality of serially-connected stripline conductors on a surface of the substrate arranged within a first area of the surface, a second plurality of serially-connected stripline conductors on the surface of the substrate arranged within a second area of the surface, wherein the encoder drives the first plurality of serially-connected stripline conductors with an RF signal and drives the second plurality of serially-connected stripline conductors with a phase-shifted version of the RF signal.

Solution to Problem

It is an object of the present invention to provide a magnetic coupler arrangement having improved signal distribution.

Another object of the present invention is to provide a method for operating a magnetic coupler resulting in improvements over the conventional technologies.

An arrangement according to the present invention is preferably part of an RFID printer/encoder, or may be used in other near field encoding applications.

Thus, according to one aspect of the present invention, an RFID printer/encoder may include an RFID magnetic coupler arrangement having an input signal source, for example, a transceiver, that provides an input signal having a target wavelength, a signal splitter connected to the signal source that receives the input signal and splits the input signal into a first signal and a second signal and inverts the second signal to provide an inverted signal, a dielectric substrate (which may be a rectangular body having a longitudinal axis extending along a length thereof), a first elongated conductive patch that receives the first signal and is disposed over a first surface of the substrate, and a second elongated conductive patch that receives the inverted signal and is disposed over the first surface of the substrate opposite and spaced from the first conductive patch, wherein the first and the second patched are longitudinally aligned along the longitudinal axis of the substrate.

In a magnetic coupler arrangement according to the present invention, the first and second conductive patches are preferably rectangular spaced bodies longitudinally aligned with one another and extending along the longitudinal axis of the substrate. In the preferred embodiment, the input signal source and the splitter are disposed on a second surface of the substrate opposite the first surface, and the first conductive patch and the second conductive patch receive the first signal and the inverted signal through respective vias that extend between the first surface and the second surface of the substrate.

Advantageous Effects of Invention

According to one aspect of the present invention, the first signal and the inverted signal are fed into the proximal ends of the patches located closest to the center of the substrate, whereby the maximum amplitude of the signals appear at the distal ends of the patches opposite the proximal ends thereof near the edges of the substrate. In the preferred embodiment, the length of each conductive patch is equal to one-quarter of the target wavelength.

The present invention utilizes signal splitting and phase-shifting to obtain a magnetic coupler arrangement having a balanced signal configuration. The current direction of a magnetic coupler arrangement according to the present invention is still directed cross directional to the media path and thus may be aligned with inlays having the standard 4" length, which are typically used for short pitch/near field applications. A property of this signal configuration is that the quarter wave length paths fed from the center of the magnetic coupler will have a half sine current distribution with a maximized amplitude towards the ends of the magnetic coupler, which is due to the low characteristic impedance of the patches yielding magnetic coupling. This is different from the current signal distribution of the prior art magnetic coupler arrangements having one-half target wavelength antenna patches which exhibit a minimum amplitude level at the ends thereof.

Other features and advantages of the present invention will become apparent from the following description of the invention which refers to the accompanying drawings.

BRIEF DESCRIPTION OF DRAWINGS

FIG. 1A depicts a top plan view of a magnetic coupler arrangement according to a first embodiment of the present invention. FIG. 1B depicts a bottom plan view of a magnetic coupler arrangement according to the first embodiment of the present invention.

FIG. 2A depicts a top plan view of a magnetic coupler arrangement according to a second embodiment of the present invention. FIG. 2B depicts a bottom plan view of a magnetic coupler arrangement according to a second embodiment of the present invention.

FIG. 3 shows a cross-sectional view of the arrangement of FIGS. 1A, 1B, 2A and 2B along line 3-3 in FIGS. 1A and 2A, viewed in the direction of the arrows.

FIG. 4 sets forth the steps in a method according to the present invention.

FIG. 5 shows the results of the application of a method according to the present invention to an input signal.

FIG. 6 illustrates the current distribution along electrically conductive patches of a magnetic coupler arrangement according to the present invention.

FIG. 7 illustrates a dipole inlay antenna aligned with a magnetic coupler arrangement according to the present invention.

FIG. 8 illustrates a dipole inlay antenna (smaller than the one shown in FIG. 7) misaligned with a magnetic coupler arrangement according to the present invention.

DESCRIPTION OF EMBODIMENTS

Example 1

FIG. 1A shows a top plan view of a magnetic coupler arrangement 10 according to the present invention, which is preferably used in a near field magnetic encoding application such as the magnetic coupler arrangement for an RFID printer/encoder. Magnetic coupler arrangement 10 includes a dielectric substrate 13 having a dipole coupler disposed on one surface thereof. Substrate 13 may be an elongated rectangular body having a longitudinal axis parallel to the length thereof. The dipole coupler includes a first elongated electrically conductive patch 12 and a second elongated electrically conductive patch 14 spaced from first electrically conductive patch 12. In the preferred embodiment, first and second electrically conductive patches 12, 14 are elongated microstrips each having generally a rectangular shape, as illustrated by FIG. 1A. First electrically conductive patch 12 includes a first terminal end 12' and a second terminal end 12" disposed opposite first terminal end 12' thereof. Second electrically conductive patch 14 also includes a first terminal end 14' and a second terminal end 14" opposite first terminal end 14' thereof. First and second electrically conductive patches 12, 14 are longitudinally aligned along the same direction (namely along the longitudinal axis of substrate 13) such that second ends 12", 14" thereof (i.e. the proximal ends that are proximate to the center of substrate 13) are arranged opposite and spaced from one another, and are closer to one another than first ends 12', 14' thereof (i.e. the distal ends of patches 12, 14 located farther from the center of substrate 13 and closer to the terminal edges thereof). It should be noted that, in the illustrated embodiment, first and second electrically conductive patches 12, 14 are of equal length. Furthermore, the length of each electrically conductive patch 12, 14 is selected to be equal to one-quarter of the wavelength of the target signal that is to be received by patches 12,14. Thus, the total length of the patches is one-half of the wavelength of the target signal. According to one aspect of the present invention, patches 12,14 are terminated transmission lines. Thus, the distal end 12', 14' of each patch 12, 14 is coupled to a respective lossy element, for example, a resistive element 9. Resistive elements 9 preferably have the same resistive value. Resistive elements 9 can reside on substrate 13 or off of substrate 13. A terminated transmission line of a quarter wave length will partly enable a termination with a real load for a matched condition at the coupler input thus minimizing frequency dependence. On the other hand, it is difficult to devise an open transmission line with an acceptable input match. Moreover, even if a match can be found, all the power supplied to the open transmission line would be radiated away resulting in isolation problems. Note that having two resistive elements is preferred in that the distal ends 12', 14' of patches 12, 14 are points on patches 12, 14 that are farthest from one another. In addition, patches of one-quarter wavelength are preferred because any multiple of one-quarter wavelength would increase the order and frequency dependence of patches 12, 14. Thus, the fundamental patch length of one-quarter would yield the broadest input match and, therefore, will have the widest bandwidth.

FIG. 1B illustrates a plan view of the back of magnetic coupler arrangement 10 which is opposite the top thereof. In one preferred embodiment, a suitable IC transceiver 16 may be disposed on the back of magnetic coupler arrangement 10 over a portion of dielectric substrate 13. Transceiver 16 is electrically coupled to two conductive nodes 18, 20. Specifically, transceiver 16 is coupled directly to node 18 by a conductive trace 21 and node 18 is electrically coupled to node 20 through a conductive transmission line 22. According to one aspect of the present invention, conductive transmission line 22 is one-half of the target wavelength.

Example 2

Referring to FIG. 2A, in which like numerals identify like features, in the second embodiment of the present invention, patches 12, 14 are elongated bodies, but are not rectangular. Rather, each patch 12, 14 include arc-shaped proximal ends 12", 14" and distal ends 12', 14'.

Referring to FIG. 2B, in the second embodiment, conductive transmission line 22 includes a serpentine portion 22'. The inclusion of serpentine portion 22' allows for obtaining a half-wavelength transmission line with a smaller foot-print. Note that, in both embodiments, transceiver 16 can reside elsewhere, and does not need to be resident on substrate 13. Furthermore, in the preferred embodiment, substrate 13 may be a three layer printed circuit board (PCB) having a common ground plane in the middle of the body thereof.

According to one aspect of the present invention, half wave length conductive transmission line 22 that extends between nodes 18 and 20 serves as a power splitter. It can be shown that the impedance of half wave length transmission line 22 is the same as the load connected at the end thereof, independent of its characteristic impedance. Thus, what is seen into the half wave length transmission line 22 is the input impedance of node 20 (which is connected to the end thereof) as if the half wave length transmission line 22 does not exist. Therefore, based on the well known theory of the Wilkinson quarter wave power divider it can be readily shown that the symmetry of equal loads at the ends of nodes 18,20 and equal characteristic impedances of the same will yield equal power division. Consequently, a signal can be split into two signals with equal amplitudes. Furthermore, the half wave length transmission line 22 phase shifts (i.e. inverts) one of the two signals by 180 degrees. Note that the shape of conductive transmission line 22 may not be critical. However, the electrical length of conductive transmission line 22 may be important. The electrical length is a function of both width and physical length. Conductive transmission line 22 may be configured into other shapes as long as common guidelines for micros trip design are followed. In the preferred embodiment, the working range for conductive transmission line 22 is defined to fall within the UHF RFID range of frequencies.

Referring now to FIG. 3, node 18 is electrically connected to second terminal end 12" of first electrically conductive patch 12 through a first conductive via 24 and node 20 is electrically connected to second terminal end 14" of second conductive patch 14 through a second conductive via 26. Note that, in the preferred embodiment, each via 24,26 extends through dielectric substrate 13 from the back to the top surface thereof. Thus, a signal sent by transceiver 16 is sent to first conductive patch 12 and second conductive patch 14 through vias 24, 26. According to one aspect of the present invention, second ends 12", 14" of first and second conductive patches 12, 14 serve to receive input signals from an input source, such as transceiver 16. Via 26 may add some electrical length but not much, which can be optimized with an EM simulation tool. Nodes 18,20, conductive trace 21, conductive transmission line 22, and vias 24,26 may be made from any suitable conductive material such as copper or the like. Dielectric substrate 13 may be made of any suitable polymer or ceramic material such as FR4 or alumina.

FIG. 4 shows the steps in a method carried out according to the present invention. Thus, an input signal is provided S10, for example, by transceiver 16, which is then split by conductive transmission line 22 into first and second signals as described above. Alternatively, a power divider such as a Wilkinson power divider can be used to split the input signal. Note that one of the first and second signals, for example, the second signal, is inverted by conductive transmission line 22 without changing the amplitude thereof S12. That is, the second signal is phase-shifted by 180 degrees by conductive transmission line 22. Note that, alternatively, an inverter circuit can be used to obtain an inverted signal. In any case, the inverted signal will have a voltage polarity that is opposite to that of the other signal at all instants in time. Thereafter, the inverted signal is fed to one of the conductive patches 12, 14 of magnetic coupler arrangement 10 and the non-inverted signal is fed to the other one of the conductive patches. Thus, for example, when the second signal is inverted, the first signal is fed by via 24 to second terminal end 12" of first electrically conductive patch 12, and the inverted signal is fed to second terminal end 14" of second conductive patch 14 by via 26. As a result, and according to an aspect of the present invention, the input signal is fed into the system impedance defined by the interrogator towards the middle of the substrate 13 between second terminal ends 12",14" of patches 12 and 14.

FIG. 5 illustrates the changes to the input signal as a result of the application of a method according to the present invention. Thus, an input signal 28 from a signal source such as transceiver 16 is split into first signal 30 and second signal 32. Signal 32 is then inverted (phase-shifted 180 degrees) relative to first signal 30, which is symbolized by box 34. Thereafter, first signal 30 and inverted signal 36 are fed to second terminal ends 12", 14" of conductive patches 12, 14 respectively.

FIG. 6 illustrates the current distribution along electrically conductive patches 12, 14 upon receiving first signal 30 and inverted signal 36. Note that the signal transmitted by each patch 12, 14 has a maximum value at the first end 12', 14' thereof. Thus, the current amplitude will have a maximum at first ends 12', 14' according to the half sine distribution. Due to the current flowing therein, patches 12,14 are surrounded by a magnetic field. In an application according to an aspect of the present invention, the inlay is positioned and energized in this reactive near field. Furthermore, the geometrical length of the magnetic coupler arrangement according to the present invention will be in the order of a half wave length of a common dipole type inlay which adds to better coupling characteristics.

FIG. 7 shows a magnetic coupler arrangement according to the present invention aligned with the dipole antenna 17 of a dipole type inlay. Under such circumstances, the balanced signal of a magnetic coupler arrangement according to the present invention will yield a symmetrical current distribution which will induce a current on the inlay antenna similar to the current created in far field when a plane wave energizes the inlay antenna.

FIG. 8 illustrates an antenna inlay 17, which may be small or non-optimally aligned (misaligned) with a magnetic coupler arrangement according to the present invention. Under such circumstances, the current maximum of the coupler arrangement at a distal end 12', 14' is utilized to still achieve acceptable coupling. Note that, in FIGS. 7 and 8, the arrow indicates the direction of movement of inlay 17 relative to coupler arrangement 10.

As can be appreciated, an architecture according to the present invention will yield coupling magnitudes higher than conventional magnetic coupler arrangements such as simple half wave transmission lines or other aligned transmission lines where the signal is not split while a magnetic coupler according to the present invention is still a terminated transmission line solution with stable input match in the printer cavity of an RFID printer/encoder. A reason for the lower yield of the conventional technique is that the phase shift of the signal is so large that the induced current in the inlay changes direction. Thus, because of the large phase shift in the magnetic coupler the current does not consistently flow in one direction across the entire inlay. It should be noted that the maximum amplitude at terminal ends 12', 14' of patches 12 and 14 will yield stronger coupling towards the inductive loop of inlays either having small sizes where no strong coupling can be achieved towards the radiating part of the inlay or inlays having a non-optimal orientation relative to the current path of the coupler. Indeed, experiments have shown that the coupling is stronger when compared with a non-balanced signal configuration for inlays of short dipole type.

It should be noted that the results shown by FIG. 6 should be considered surprising and unexpected. That is, pursuant to conventional understanding, when the two patches are of equal length but receive signals of opposite polarity, cancellation or at least reduction of signal strength would be expected. However, because, in a coupler arrangement according to the present invention, the combined signal is located at the same geometric location, namely the center of substrate 13, the direction of propagations along the patches 12, 14 for the two signal halves are opposite to each other, i.e. towards the outer, distal ends 12',14' where the terminations are located. Consequently, the current will flow in one direction along the entire length of the coupler at all time instants. The purpose of the balanced signal configuration of a magnetic coupler arrangement according to the present invention is to achieve symmetry in current amplitude much like the short dipole type inlay is symmetrical in geometry.

A magnetic coupler arrangement according to the present invention optimizes size so that the coupler can be fixed close to the dot line of the printer such as onto the TPH (Thermal Print Head). In addition, the microstrip patches 12,14 constrain the electromagnetic field of the coupler to achieve isolation for short pitch/near field applications. Thus, together with the geometry and the magnetic principle a compact magnetic coupler can be designed that can be fitted into tight spaces. A magnetic coupler arrangement according to the present invention can be used in RFID printers/encoders as well as in other near field magnetic encoder applications for near field encoding of inlays where inlay encoding in near field is needed with a short pitch on a media roll. Furthermore, because the magnetic coupler is in the order of one half of the target wavelength it can couple to one half wave length inlays, which are very common, thereby adding to the coupling characteristics of the magnetic coupler arrangement.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

INDUSTRIAL APPLICABILITY

The present invention relates to RFID technology, and particularly to a magnetic coupler arrangement suited for use in an RFID printer/encoder or other near field encoding applications.

A magnetic coupler that employs a terminated transmission line can be used in encoding of RFID-enabled labels, tickets, tags, cards or other media.

The invention claimed is:

1. An RFID magnetic coupler arrangement, comprising:
- an input signal source that provides an input signal having a target wavelength;
- a splitter including a single conductive transmission line coupled to the signal source that receives the input signal and splits the input signal into a first signal and a second signal, said splitter being configured to phase-shift said second signal by 180 degrees;
- a dielectric substrate having a longitudinal axis extending along a length thereof;
- a first elongated conductive patch that receives the first signal and is disposed over a first surface of the substrate; and
- a second elongated conductive patch that receives the second phase-shifted signal and is disposed over the first surface of the substrate opposite and spaced from the first conductive patch, wherein the first conductive patch and the second conductive patch are longitudinally aligned with one another and extend along the longitudinal axis of the dielectric substrate,
- the input signal source being disposed on a second surface of the substrate, the second surface of the substrate being on a vertically opposed side of the dielectric substrate to a side of the dielectric substrate defining the first surface of the substrate.

2. The RFID magnetic coupler arrangement of claim 1, wherein the first and the second conductive patches are rectangular bodies longitudinally aligned with one another.

3. The RFID magnetic coupler arrangement of claim 1, wherein the splitter is disposed on the second surface of the substrate.

4. The RFID magnetic coupler arrangement of claim 3, wherein the first conductive patch and the second conductive patch receive the first signal and the second phase-shifted signal through respective vias that extend between the first surface and the second surface of the substrate.

5. The RFID magnetic coupler arrangement of claim 1, wherein the input signal source is a transceiver.

6. The RFID magnetic coupler arrangement of claim 1, wherein the first conductive patch and the second conductive patch are elongated bodies each having a length equal to one quarter of the target wave length.

7. The RFID magnetic coupler arrangement of claim 1, wherein the first conductive patch includes a first terminal end and a second terminal end, and the second conductive patch includes a first terminal end and a second terminal end, the first terminal ends of the first and second patches being farther from one another than the second terminal ends thereof, and wherein the second terminal end of the first conductive patch receives the first signal and the second terminal end of the second conductive patch receives the second phase-shifted signal.

8. The RFID magnetic coupler arrangement of claim 1, wherein the single conductive transmission line has a length that is equal to one-half wavelength of the target wave-length.

9. The RFID magnetic coupler arrangement of claim 1, wherein the first and second conductive patches comprise microstrip terminated transmission lines.

10. An RFID printer/encoder comprising the RFID magnetic coupler arrangement of claim 1.

11. The use of the RFID magnetic coupler arrangement of claim 1 in near field encoding of inlays.

12. A method of operating an RFID magnetic coupler arrangement, comprising:

providing an input signal having a target wavelength;

splitting the input signal by a splitter including a single conductive transmission line into a first signal and a second signal;

phase shifting the second signal by 180 degrees relative to the first signal to obtain a phase-shifted signal; and feeding the first signal and the phase-shifted signal to respective conductive patches residing on a dielectric substrate, thereby producing a magnetic field surrounding the respective conductive patches.

13. The method of claim 12, wherein said conductive patches include two elongated patches longitudinally aligned with one another each having a proximal end proximate the center of the dielectric substrate and a distal end opposite the proximal end, and wherein one of the proximal ends receives the first signal and the other proximal end receives the phase-shifted signal.

14. The method of claim 13, wherein the patches are rectangular.

15. The method of claim 13, wherein each proximal end receives a respective one of the first signal and the phase-shifted signal from a via that extends through the dielectric substrate.

16. An RFID magnetic coupler arrangement, comprising:

an input signal source that provides an input signal having a target wavelength;

a splitter coupled to the signal source that receives the input signal and splits the input signal into a first signal and a second signal, said splitter being configured to phase-shift said second signal by 180 degrees;

a dielectric substrate having a longitudinal axis extending along a length thereof;

a first elongated conductive patch that receives the first signal and is disposed over a first surface of the substrate; and a second elongated conductive patch that receives the second phase-shifted signal and is disposed over the first surface of the substrate opposite and spaced from the first conductive patch, wherein the first conductive patch and the second conductive patch are longitudinally aligned with one another and extend along the longitudinal axis of the dielectric substrate, wherein each of the first conductive patch and the second conductive patch is an elongated microstrip having a rectangular shape, and wherein the first conductive patch and the second conductive patch, upon receiving the first signal and the second phase-shifted signal, respectively, are surrounded by a magnetic field due to the electric current flowing in the first conductive patch and in the second conductive patch.

* * * * *